(12) United States Patent
Ruijl

(10) Patent No.: US 7,284,907 B2
(45) Date of Patent: Oct. 23, 2007

(54) GAS BEARING SYSTEM

(75) Inventor: Theo Anjes Maria Ruijl, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 211 days.

(21) Appl. No.: 10/539,368

(22) PCT Filed: Nov. 18, 2003

(86) PCT No.: PCT/IB03/05262
§ 371 (c)(1),
(2), (4) Date: Jun. 15, 2005

(87) PCT Pub. No.: WO2004/055400
PCT Pub. Date: Jul. 1, 2004

(65) Prior Publication Data
US 2006/0147130 A1    Jul. 6, 2006

(30) Foreign Application Priority Data
Dec. 18, 2002   (EP) .................................. 02080366

(51) Int. Cl.
*F16C 32/06* (2006.01)

(52) U.S. Cl. ....................................... 384/12; 384/100
(58) Field of Classification Search .................. 384/12, 384/13, 100
See application file for complete search history.

(56) References Cited

U.S. PATENT DOCUMENTS

| | | | |
|---|---|---|---|
| 3,981,546 A * | 9/1976 | Sperman ...................... 384/12 |
| 4,448,460 A * | 5/1984 | Yamamoto .................... 384/12 |
| 4,844,194 A | 7/1989 | De Alessi et al. |
| 5,106,204 A * | 4/1992 | Dunham ....................... 384/12 |
| 5,518,360 A * | 5/1996 | Toda et al. ................. 414/755 |
| 6,164,827 A * | 12/2000 | Eitzenberger ................. 384/12 |
| 2004/0161179 A1 * | 8/2004 | Zywno ......................... 384/12 |

* cited by examiner

*Primary Examiner*—Thomas R. Hannon

(57) ABSTRACT

A gas bearing system comprising two opposing substantially parallel bearing surfaces (2, 3) and at least one gas duct (6) for supplying gas through an orifice (7) to the bearing gap (5) between the bearing surfaces (2, 3). At least one of the bearing surfaces (2, 3) is provided with at least one cavity (8, 9) extending over 0.3 mm$^2$ to 3 mm$^2$ of the at least one bearing surface (2, 3). The content of the cavity (8, 9) may be between 0.3 mm$^3$ and 4 mm$^3$. The gas duct (6) may supply gas to the cavity (8) through an orifice (7) in the wall of the cavity (8).

20 Claims, 1 Drawing Sheet

— Prior Art —

— Prior Art —

GAS BEARING SYSTEM

The invention is related to a gas bearing system comprising two opposing substantially parallel bearing surfaces and at least one gas duct for supplying gas through an orifice to the bearing gap between said bearing surfaces.

The gas bearing system may have substantially flat bearing surfaces, so that it can be used to support and guide a member making a translating movement. Such gas bearing systems are frequently used as guiding and supporting elements in high precision machines. The bearing surfaces may also have a cylindrical shape, so that a rotating member can be supported. Also other shapes—adapted to the relative movement of the bearing surfaces—are possible, for example a spherical shape to support a member making a tumbling movement.

In general, such a gas bearing system must have a relatively high stiffness, but there must also be an effective damping of vibrations in the bearing system, especially in case the gas bearing system is used in high precision machines, like coordinate measuring machines.

To achieve a high servo performance, gas bearings have to fulfil certain requirements with respect to stiffness and damping. Especially when gas bearings are used in high precision machines, the stiffness and damping of the gas bearing may have a significant influence on the entire dynamic performance of the machine. Often, such gas bearings are optimized with respect to stiffness, but to achieve a high servo performance, damping is an important issue as well.

The object of the invention is to provide an improvement of gas bearing systems resulting in considerably higher damping, while the stiffness remains relatively high.

In order to accomplish that objective, at least one of said bearing surfaces is provided with at least one cavity extending over 0.3 $mm^2$ to 3 $mm^2$, preferably over 0.5 $mm^2$ to 2 $mm^2$, of said at least one bearing surface. In one preferred embodiment the content of said cavity is between 0.3 $mm^3$ and 4 $mm^3$, preferably between 0.5 $mm^3$ and 2 $mm^3$, and more preferably between 0.7 $mm^3$ and 1.5 $mm^3$. One or more cavities may be present in one of the bearing surfaces, but also both bearing surfaces may be provided with such cavities.

In practice it has been found that such a cavity, and especially more of such cavities, have only little influence on the stiffness of the bearing, so that the stiffness remains high, but the presence of such cavities increases the capacity of damping vibrations in the system considerably.

In one preferred embodiment said gas duct supplies gas to said cavity through an orifice in the wall of said cavity. In case there is more than one gas supply duct, each of the gas supply ducts may be provided with a cavity at its mouth, and apart from that more cavities may be present in the bearing surfaces.

A gas bearing system provided with a cavity at the mouth of the gas supply duct is disclosed in U.S. Pat. No. 4,844,194, wherein a number of cavities are present in one of the bearing surfaces, and an orifice for supplying gas to the bearing gap between the substantially parallel bearing surfaces is present in the wall of each cavity. The dimensions of the cavities are very small, but the diameter parallel to said bearing surfaces is large to avoid a throttle effect between the mouth of the orifice and the opposing bearing surface. Without the small cavity there would be a relatively strong and varying throttle effect at the mouth of the orifice, caused by the small and varying distance between the two bearing surfaces. The distance between the two substantially parallel bearing surfaces is for example between 0.005 mm and 0.01 mm, and the diameter of the orifice is for example between 0.1 mm and 0.2 mm.

Preferably, the depth of the cavity is at least two times, preferably at least four times, more preferably at least six times the diameter of said orifice, said orifice having a diameter between 0.05 mm and 0.3 min, preferably between 0.07 mm and 0.25 mm, and more preferably between 0.1 mm and 0.2 mm.

In a preferred embodiment the dimension of the cavity in a direction parallel to said bearing surface is between 0.5 mm and 2.5 mm, preferably between 0.5 mm and 1.5 mm, more preferably between 0.7 mm and 1.2 mm. The cavity may have a substantially cylindrical shape, with the axis of the cylinder being directed substantially perpendicularly to said substantially parallel bearing surfaces. Such a cavity can be easily manufactured by a material removing drilling operation.

Preferably, the depth of the cavity is between 0.3 mm and 2 mm, more preferably between 0.5 mm and 1.5 mm, and in a more preferred embodiment between 0.7 mm and 1.2 mm.

Very good results have been achieved in a gas bearing system comprising a square flat bearing surface with sides of 40 mm, with one of the bearing surfaces being provided with four cylindrical cavities having a diameter of 1.5 mm and a depth of 1 mm, and the gas supply duct debouching into one of the cavities, the diameter of the orifice being 0.15 mm.

The invention furthermore relates to a high precision machine comprising a gas bearing system as described above.

The invention will now be explained in more detail hereinafter by means of a description of different embodiments of a gas bearing system provided with flat bearing surfaces, in which reference is made to a drawing, in which.

The figures are merely schematic representations of the embodiments, in which some dimensions are out of proportion to achieve a better representation of relevant details.

Figure 1:
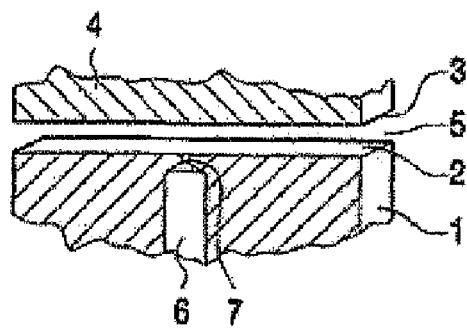
FIG. 1 is a sectional view in perspective of a prior art gas bearing system.

FIG. 1 shows a gas bearing system comprising a first bearing member 1 having a bearing surface 2, opposing a second bearing surface 3 of a second bearing member 4. According to this embodiment both bearing surfaces 2,3 are flat planes and the bearing surfaces 2,3 are directed parallel to each other. The bearing members 1,4 may be made from metal or plastic or another material.

Between the two bearing surfaces 2,3 is a bearing gap 5 into which air, or another gas, is brought through air supply duct 6 in bearing member 1. Air supply duct 6 terminates near bearing surface 2 and is connected with bearing gap 5 by an orifice 7 restricting the airflow.

The first bearing member 1 can be present at a fixed location in a machine, while the second bearing surface 3 of the second bearing member 4 can move over the fixed first bearing surface 2 to guide and support another part of the machine. Bearing member 4 is supported by an air cushion in the bearing gap 5 between the two bearing surfaces 2,3. More than one orifice 7 can be present to supply air to the bearing gap 5 between the two bearing surfaces 2,3 to maintain the air cushion. It is also possible to provide the moving bearing member 4 with an air supply duct instead of the air supply duct 6 in bearing member 1, or additional to air supply duct 6.

The dimensions of the bearing system can be as follows. The bearing surfaces 2,3 may have a dimension of about 20 cm². The distance between the two bearing surfaces 2,3 can be between 0.005 mm and 0.01 mm. The diameter of the orifice 7 can be between 0.1 mm and 0.2 mm, and its length is for example 1 mm.

Figure 2:
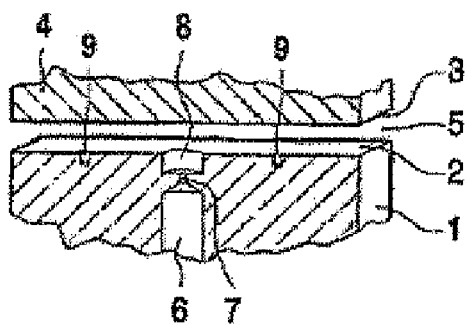
FIG. 2 is a similar view of a first embodiment of a gas bearing system according to the invention.

FIG. 2 shows a first embodiment of a gas bearing system according to the invention. The bearing surface 2 is provided with one cavity 8 and with two cavities 9. All three cavities 8,9 have a cylindrical shape with a diameter of 1.5 mm and a length (or depth) of 1 mm. The axis of the cylinder is directed perpendicularly to the bearing surface 2.

Each cavity 9 is closed at all sides, except for the side facing the bearing gap 5. Air supply duct 6 is connected with cavity 8 by orifice 7 in the bottom of cavity 8, so that the supplied air flows through the cavity 8 before it reaches the bearing gap 5 between the two bearing surfaces 2,3.

It has been found that the presence of one or more cavities 8,9 in the bearing surface 2,3 results in a considerable increase of the capacity of damping vibrations in the gas bearing system, i.e. vibrations of bearing member 4 relative to bearing member 1, while the stiffness of the bearing system remains high.

Figure 3:
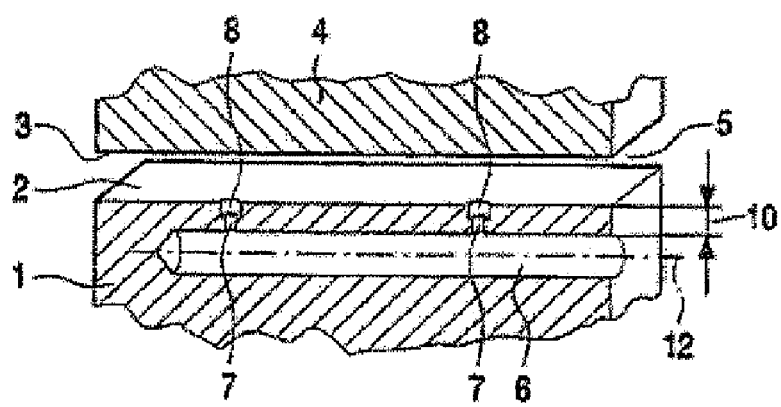
FIG. 3 is a similar view of a second embodiment of a gas bearing system according to the invention.

FIG. 3 shows a second embodiment of the gas bearing system according to the invention, wherein similar parts are indicated by means of the same reference numbers as in FIG. 2. In this embodiment the axis 12 of the air supply duct 6 is positioned parallel to the bearing surface 2. There are a number of orifices 7 between the air supply duct 6 and the bearing gap 5 between the two bearing surfaces 2,3; only two of such orifices are shown in FIG. 3. The cavities 8 as well as the orifices 7 are manufactured by a material-removing drilling operation.

An additional advantage of the use of the cavities 8 in the gas bearing system as shown in FIG. 3 is the presence of more material between the air supply duct 6 and the bearing surface 2. The thickness of that material equals the length of the orifice 7 plus the depth of the cavity 8. This increased thickness facilitates the manufacturing of bearing member 1 of the gas bearing system. The dimension 10 of that material, i.e. said thickness, is indicated in FIG. 3.

Figure 4:
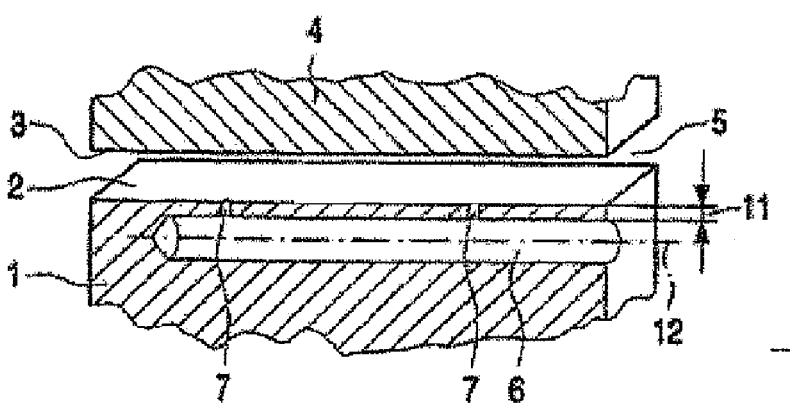
FIG. 4 shows again a prior art gas bearing system.

FIG. 4 shows a similar gas bearing system according to the prior art, wherein dimension 11 is also the distance between air supply duct 6 and bearing surface 2. Because the length of orifice 7 is limited, said dimension 11 is much smaller than dimension 10 in FIG. 3, so that there is only a very small thickness of the material between air supply duct 6 and bearing surface 2.

The embodiments as described above are merely examples; a great many other embodiments are possible, for example gas bearing systems having cylindrical bearing surfaces, where one of the bearing members rotates around the axis of the cylinder and cavities are present in at least one of the bearing surfaces for damping vibrations in the system. Also other shapes—adapted to the relative movement of the bearing surfaces 2,3—are possible, for example a spherical shape to support a bearing member 4 making a tumbling movement.

The invention claimed is:

1. A gas bearing system comprising two opposing substantially parallel bearing surfaces (2,3) and at least one gas duct (6) for supplying gas through an orifice (7) to the bearing gap (5) between said bearing surfaces (2,3), characterized in that at least one of said bearing surfaces (2) is provided with at least one cavity (8,9) extending over 0.3 mm² to 3 mm² of said at least one bearing surface (2) and that the content of said cavity (8,9) is between 0.3 mm³ and 4 mm³.

2. A gas bearing system as claimed in claim 1, characterized in that said gas duct (6) supplies gas to said cavity (8) through an orifice (7) in a wall of said cavity (8).

3. A gas bearing system as claimed in claim 1, characterized in that the depth of the cavity (8,9) is at least two times the diameter of said orifice (7).

4. A gas bearing system as claimed in claim 1, characterized in that said orifice (7) has a diameter between 0.05 mm and 0.3 mm.

5. A gas bearing system as claimed in claim 1, characterized in that the dimension of the cavity (8,9) in a direction parallel to said bearing surface (2) is between 0.5 mm and 2.5 mm.

6. A gas bearing system as claimed in claim 1, characterized in that the cavity (8,9) has a substantially cylindrical shape, the cylindrical axis being directed substantially perpendicularly to said substantially parallel bearing surfaces (2,3).

7. A gas bearing system as claimed in claim 1 characterized in that the depth of the cavity (8,9) is between 0.3 mm and 2 mm.

8. A machine comprising a gas bearing system, characterized by a gas bearing system as claimed in claim 1.

9. A gas bearing system comprising two opposing substantially parallel bearing surfaces (2,3) and at least one gas duct (6) for supplying gas through an orifice (7) to the bearing gap (5) between said bearing surfaces (2,3), characterized in that at least one of said bearing surfaces (2) is provided with at least one cavity (8,9) extending over 0.3 mm² to 3 mm² of said at least one bearing surface (2) and in that the depth of the cavity (8,9) is at least two times the diameter of said orifice (7).

10. A gas bearing system as claimed in claim 9, characterized in that the content of said cavity (8,9) is between 0.3 mm³ and 4 mm³.

11. A gas bearing system as claimed in claim 9, characterized in that said gas duct (6) supplies gas to said cavity (8) through an orifice (7) in a wall of said cavity (8).

12. A gas bearing system as claimed in claim 9, characterized in that said orifice (7) has a diameter between 0.05 mm and 0.3 mm.

13. A gas bearing system as claimed in claim 9, characterized in that the cavity (8,9) has a substantially cylindrical shape, the cylindrical axis being directed substantially perpendicularly to said substantially parallel bearing surfaces (2,3).

14. A machine comprising a gas bearing system, characterized by a gas bearing system as claimed in claim 9.

15. A gas bearing system comprising two opposing substantially parallel bearing surfaces (2,3) and at least one gas duct (6) for supplying gas through an orifice (7) to the bearing gap (5) between said bearing surfaces (2,3), characterized in that at least one of said bearing surfaces (2) is provided with at least one cavity (8,9) extending over 0.3 mm² to 3 mm² of said at least one bearing surface (2) and in that the depth of the cavity (8,9) is between 0.3 mm and 2 mm.

16. A gas bearing system as claimed in claim 15, characterized in that the content of said cavity (8,9) is between 0.3 mm³ and 4 mm³.

17. A gas bearing system as claimed in claim 15, characterized in that said gas duct (6) supplies gas to said cavity (8) through an orifice (7) in a wall of said cavity (8).

18. A gas bearing system as claimed in claims 15, characterized in that the dimension of the cavity (8,9) in a direction parallel to said bearing surface (2) is between 0.5 mm and 2.5 mm.

19. A gas bearing system as claimed in claims 15, characterized in that the cavity (8,9) has a substantially cylindrical shape, the cylindrical axis being directed substantially perpendicularly to said substantially parallel bearing surfaces (2,3).

20. A machine comprising a gas bearing system, characterized by a gas bearing system as claimed in claim 15.

* * * * *